(12) United States Patent
Aggarwal et al.

(10) Patent No.: US 8,457,657 B2
(45) Date of Patent: Jun. 4, 2013

(54) METHOD AND APPARATUS FOR PEER-ASSISTED LOCALIZATION

(75) Inventors: Alok Aggarwal, Foster City, CA (US); Ayman Fawzy Naguib, Santa Clara, CA (US); Saumitra Mohan Das, San Jose, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 12/692,390

(22) Filed: Jan. 22, 2010

(65) Prior Publication Data

US 2011/0183683 A1  Jul. 28, 2011

(51) Int. Cl.
*H04W 24/00* (2009.01)

(52) U.S. Cl.
USPC .................................. 455/456.2; 455/456.6

(58) Field of Classification Search
USPC ........................................... 455/456.1–456.6
See application file for complete search history.

(56) References Cited

U.S. PATENT DOCUMENTS

| | | | |
|---|---|---|---|
| 4,494,119 A | 1/1985 | Wimbush | |
| 5,708,440 A | 1/1998 | Trimble et al. | |
| 5,926,765 A | 7/1999 | Sasaki | |
| 5,999,124 A | 12/1999 | Sheynblat | |
| 6,031,490 A | 2/2000 | Forssen et al. | |
| 6,266,014 B1 | 7/2001 | Fattouche et al. | |
| 6,300,905 B1 | 10/2001 | Chen et al. | |
| 6,347,228 B1 | 2/2002 | Ludden et al. | |
| 6,421,009 B2 | 7/2002 | Suprunov | |
| 6,442,484 B1 | 8/2002 | Miller et al. | |
| 6,519,464 B1 | 2/2003 | Santhoff et al. | |
| 6,574,266 B1 | 6/2003 | Haartsen | |
| 6,618,670 B1 | 9/2003 | Chansarkar | |
| 6,639,554 B2 | 10/2003 | Kim et al. | |
| 6,720,922 B2 | 4/2004 | Williams et al. | |
| 6,826,162 B2 * | 11/2004 | Haines et al. ................. 370/332 |
| 6,961,575 B2 | 11/2005 | Stanforth | |
| 7,016,673 B2 | 3/2006 | Reddy et al. | |
| 7,042,867 B2 | 5/2006 | Whitehill et al. | |
| 7,079,025 B2 | 7/2006 | Michalson et al. | |
| 7,084,809 B2 | 8/2006 | Hockley, Jr. et al. | |
| 7,102,570 B2 | 9/2006 | Bar-On et al. | |

(Continued)

FOREIGN PATENT DOCUMENTS

| | | |
|---|---|---|
| CN | 1486577 A | 3/2004 |
| EP | 1235076 A1 | 8/2002 |

(Continued)

OTHER PUBLICATIONS

International Search Report and Written Opinion—PCT/US2011/022117—ISA/EPO—May 18, 2011.

(Continued)

*Primary Examiner* — Steven Lim
(74) *Attorney, Agent, or Firm* — Arnold J. Gum (57) ABSTRACT

The subject matter disclosed herein relates to a system and method for receiving, by a first mobile station, a signal transmitted from a second mobile station and addressed to a communication device (e.g., a communication device having a known location). The signal comprises a location estimate for the second mobile station. A range from the first mobile station to the second mobile station is estimated based at least in part on a measured signal strength of the received signal.

55 Claims, 4 Drawing Sheets

U.S. PATENT DOCUMENTS

| | | | |
|---|---|---|---|
| 7,203,500 B2 | 4/2007 | Leeper et al. | |
| 7,239,277 B2 | 7/2007 | Fullerton et al. | |
| 7,286,842 B2 | 10/2007 | Li et al. | |
| 7,369,524 B2 | 5/2008 | Taubenheim et al. | |
| 7,548,758 B2 | 6/2009 | Periyalwar et al. | |
| 7,577,443 B1 * | 8/2009 | Moll et al. | 455/456.1 |
| 2002/0055362 A1 | 5/2002 | Aoyama | |
| 2004/0012524 A1 | 1/2004 | Couronne et al. | |
| 2005/0049821 A1 | 3/2005 | Sahinoglu | |
| 2006/0025154 A1 | 2/2006 | Alapuranen et al. | |
| 2006/0215611 A1 | 9/2006 | Nakagawa et al. | |
| 2006/0267841 A1 | 11/2006 | Lee et al. | |
| 2008/0009295 A1 * | 1/2008 | Brousseau et al. | 455/456.1 |
| 2008/0039066 A1 | 2/2008 | Laroia et al. | |
| 2008/0153497 A1 * | 6/2008 | Kalhan | 455/436 |
| 2008/0280625 A1 * | 11/2008 | Larsen | 455/456.1 |
| 2009/0233622 A1 | 9/2009 | Johnson | |
| 2012/0244880 A1 | 9/2012 | Lee et al. | |

FOREIGN PATENT DOCUMENTS

| | | |
|---|---|---|
| GB | 2359699 | 9/2001 |
| JP | 2001305210 | 10/2001 |
| JP | 2004516463 A | 6/2004 |
| WO | WO9954752 | 10/1999 |
| WO | WO9963358 A1 | 12/1999 |
| WO | WO0196898 A2 | 12/2001 |
| WO | WO0225309 A1 | 3/2002 |
| WO | WO0249379 A1 | 6/2002 |
| WO | WO03009608 A2 | 1/2003 |
| WO | WO2005045455 A2 | 5/2005 |
| WO | WO2007149614 A2 | 12/2007 |

OTHER PUBLICATIONS

Sanchez R. et al., "RDRN: A Prototype for a Rapidly Deployable Radio Network", ACM Mobile Computing and Communications Review, 1998, pp. 1-8, vol. 2, No. 2.

Telecommunications Industry Association, Mobile Station-Base Station Compatibility Standard for Dual-Mode Wideband Spread Spectrum Cellular System, TIA/EIA-95, Jul. 1993, 668 pages.

TIA/EIA/IS-2000.2-A, Physical Layer Standard for cdma2000 Standards for Spread Spectrum Systems (Revision of TIA/EIA/IS-2000.2)(Mar. 2000).

TIA/EIA/IS-856 Interim Standard cdma2000 High Rate Packet Data Air Interface Specification (Nov. 2000).

* cited by examiner

FIG. 5

METHOD AND APPARATUS FOR PEER-ASSISTED LOCALIZATION

BACKGROUND

1. Field

The subject matter disclosed herein relates to localization of a mobile station.

2. Information

Different techniques may be used to estimate the location of a mobile station, such as a cell phone, personal digital assistant (PDA), or any other mobile wireless device. For example, some mobile stations may process signals received from a Satellite Positioning System (SPS) to estimate their locations. However, there are sometimes certain areas where navigation signals from an SPS may not be available, such as in certain indoor locations.

A mobile station may estimate its location within an area where navigation signals transmitted from an SPS are not available. For example, a mobile station may transmit a signal to an access point and measure a length of time until a response signal from the access point is received. A range from the mobile station to the access point may be determined based upon the measured length of time between transmission of a signal from the mobile station and receipt of a response signal at the mobile station. Alternatively, signal strength of a signal received from the access point may be measured and a range from the mobile station to the access point may be estimated based on the measured signal strength. An access point, for example, may comprise a device that allows mobile stations to communicate with a network.

BRIEF DESCRIPTION OF THE FIGURES

Non-limiting and non-exhaustive features will be described with reference to the following figures, wherein like reference numerals refer to like parts throughout the various figures.

SUMMARY

In one particular implementation, a system and method are provided for receiving, by a first mobile station, a signal transmitted from a second mobile station and addressed to a communication device (e.g., a communication device having a known location). The signal comprises a location estimate for the second mobile station. A range from the first mobile station to the second mobile station is estimated based at least in part on a measured signal strength of the received signal. It should be understood, however, that this is merely an example implementation and that claimed subject matter is not limited in this respect.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

A mobile station may determine its location or position. In one implementation, a mobile station may estimate its location based on signals wirelessly received from wireless network elements or other devices capable of wirelessly transmitting signals. For example, a mobile station may be utilized within an area where navigation signals from a Satellite Positioning System (SPS) are not available, such as within certain buildings. Wireless network elements, such as access points, may be located throughout such an area at known locations and a mobile station may estimate ranges from the mobile station to particular wireless network elements. After ranges have been estimated, a location of such a mobile station may be triangulated using known techniques.

For example, a mobile station may use any one of several techniques to estimate a range to a wireless network element. One way of estimating such a range is by wirelessly transmitting a signal requesting that an acknowledgement be transmitted in response to receiving the signal. For example, a signal requesting an acknowledgement response, such as a probe request signal, may be transmitted to a particular wireless network element. Upon receiving a probe request, for example, a wireless network element may wirelessly transmit a response or acknowledgement signal. A mobile station may measure a time interval (referred to herein as "roundtrip time") between when the mobile station transmits the probe request and a time at which the response signal is received. Wirelessly transmitted signals may travel at a known speed, such as at the speed of light. Accordingly, based upon a roundtrip time between when the probe request is transmitted and the response is received, a range may be estimated.

In order to estimate a range to an access point, another wireless network element, or another mobile station with a relatively high degree of accuracy, a mobile station may utilize a high-resolution timing chip or circuitry, for example. "High resolution timing," as used herein may refer to a timing chip or circuitry capable of measuring a time interval to within a predefined level of accuracy. Accuracy may be dependent on a front end of a wireless device. If, for example, such a front end operates at 20 MHz, timing accuracy may be within about 50.0 ns. If, on the other hand, such a front end operates at 40 MHz, timing accuracy may instead be within about 25.0 ns. However, even if each wireless Local Area Network (LAN) timing chip in a system has such high resolution timing capability, each LAN timing chip may also have an ability to measure a time interval and store such a measured time interval for further processing of a round-trip time (RTT) delay between transmitting a signal to another wireless device and receiving a signal from such other wireless device.

In one implementation, a time interval is measured by a high resolution timing chip or circuitry between a time at which a probe request is transmitted to an access point and a time at which a probe acknowledgement is received at the mobile station. After such a time interval is measured and any related estimated or actual signal processing delays are subtracted from the measured time interval, a range between the mobile station and such an access point may be estimated.

Some mobile stations, however, do not utilize timing chips or circuitry with a high resolution timing feature. Such mobile stations may therefore be unable to estimate a range to one or more wireless network elements with a relatively high degree of accuracy. For example, if a measured time interval is incorrect by a mere 1.0 μsec, for example, an estimated round-trip range could be incorrect by about 1,000 feet, assuming that the signals travel at the speed of light. Accordingly, an error of 500 feet could be introduced in ranging in this example.

"Wireless network element," as used herein, may refer to a device, e.g., a communication device, that, for example, allows mobile stations/wireless communication devices to communicate with a network. For example, a wireless network element may comprise an access point, a femtocell, etc. and may allow mobile stations/wireless communication devices to connect to a wireless network using Wi-Fi, Bluetooth, a cellular communication technology such as such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), or any other suitable wireless technology and/or standard.

In one implementation, a mobile station may estimate its own location by communicating with one or more nearby femtocells. A "femtocell," as used herein, may refer to a small cellular base station. Such a femtocell may connect to a service provider's network via broadband (such as, for example, via Digital Subscriber Line (DSL) or cable). A femtocell may, for example, utilize a technology such as Universal Mobile Telecommunications System (UTMS), Long Term Evolution (LTE), Evolution-Data Optimized or Evolution-Data only (EV-DO), Global System for Mobile communications (GSM), Worldwide Interoperability for Microwave Access (WiMAX), CDMA2000, or Time Division Synchronous Code Division Multiple Access (TD-SCDMA), to name just a few among many possible technologies compatible with femtocells. A femtocell may also have integrated Wi-Fi. Round-trip time ranging may be performed with femtocells.

Another technique for estimating a range from a mobile station to a wireless network element includes measuring signal strength of a signal received from a wireless network element or another mobile station. A response or acknowledgement signal may be transmitted from a wireless network element to a mobile station in response to a probe request, as discussed, and a strength of such a response signal may be measured. Based on such a measured signal strength, a range from the mobile station to the wireless network element may be estimated. Alternatively, a wireless network element may periodically broadcast a signal without first receiving a probe request, and a strength of such a received broadcast signal may be measured. In another example, a mobile station may transmit a signal addressed to a wireless network element and a second mobile station may receive the signal intended for the wireless network element. For example, a second mobile station may "listen" to a signal transmitted from a first mobile station to an access point. Based upon a measured strength of such a signal as received by a second mobile station, a range between the first mobile station and the second mobile station may be estimated.

In one implementation, wireless network elements may transmit signals at a known transmission power. In a location with no obstructions, for example, a strength of a signal transmitted from a wireless network element may decrease at a known rate over a given range. For example, if a signal strength of a signal received by a mobile station is −55.0 decibels referenced to 1.0 mWatt ("dBm") and transmission power of the signal by a wireless network element is 17.0 dBm, the mobile station may estimate the range to be about 100 feet. On the other hand, if signal strength of a received signal is measured to be −65.0 dBm by a mobile station, then the mobile station may estimate the range to be 300 feet. Signal strength may decrease at a known rate over distance and, based on the measurement of signal strength of a signal received from a wireless network element, a range from a mobile station to a wireless network element may be estimated. A relationship between signal strength and distance may be estimated by various means. For example, a rate at which signal strength decreases over distance may be utilized if known, or propagation characteristics of a building/structure in which the signals are propagating may additionally and/or alternatively be utilized to estimate distance, to name just two examples.

In a given area, there may be a number of wireless network elements, such as access points, and mobile stations. Some of the mobile stations may contain/utilize high resolution timing chips or circuitry, whereas other mobile stations may not contain/utilize such high resolutions timing chips or circuitry. Accordingly, a mobile station which does not utilize a high resolution timing chip or circuitry may inaccurately estimate ranges to one or more wireless network elements or mobile stations because of imprecision in timing. To circumvent this potential issue, some mobile stations may periodically "listen" for signals transmitted from nearby mobile stations, for example, and effectively piggyback off nearby peer mobile stations to estimate a range to a nearby wireless network element.

In one implementation, a mobile station that utilizes a high resolution timing chip may periodically estimate its location every 10.0 seconds, for example. Each time that such a mobile station desires to determine its location, the mobile station may transmit one or more signals requesting acknowledgement responses, such as probe requests, to nearby wireless network elements, such as access points. A probe request may be transmitted in the form of a packet-based communication, for example. Such a mobile station may receive acknowledgement signals/packets from one or more wireless network elements receiving such a probe request from the mobile station. Such a mobile station may estimate ranges to one or more wireless network elements transmitting acknowledgement signals, based at least in part, on a measured time interval between transmission of a probe request and receipt of various acknowledgement signals from such access points. In the event that three or more acknowledgement signals are received, such that a mobile station is able to determine respective ranges to three or more wireless network elements having known locations, such a mobile station may determine its location or position via use of trilateration/triangulation or other techniques, for example.

While transmitting a probe request packet, a mobile station having a high resolution timing chip or circuitry may include its most recently estimated location within the probe request packet. A nearby mobile station that does not utilize a high resolution timing chip or circuitry may receive such a probe request packet. Such a nearby mobile station may estimate its distance from a transmitting mobile station based on a receive signal strength of such a received probe request packet. If such a receive signal strength is determined to be above a predefined threshold amount, such as above −41.0 dBm, and transmission power of a transmitting device is known to be 17.0 dBm (0.05 Watts), for example, a nearby mobile station may determine that it is within approximately 30.0 feet of a transmitting mobile station. If the receive signal strength is greater than such a threshold level, the receiving mobile station may estimate a location of the transmitting mobile station to be its previous location (e.g., the location transmitted within the probe request packet). Based on a measurement of received signal, such a receiving mobile station may estimate its range to a transmitting mobile station. Such a nearby mobile station may also listen for probe requests and/or data transmissions transmitted by other nearby mobile stations and may determine its range to one or more of such transmitting mobile stations based upon measured receive signal strength. A nearby mobile station may further listen for acknowledgement packets transmitted from wireless network elements, such as access points and may determine its range to such wireless access points based on measurements of receive signal strength. After three or more ranges from a mobile station to other mobile stations having known locations and/or to other wireless network elements having known locations have been obtained, such a mobile station may determine its location or position via trilateration/triangulation or other techniques, for example.

In one implementation, for example, if a mobile station listens for communications from other mobile stations and receives a packet or other signal having a measured signal strength above a high threshold level, such a mobile station may determine that it is very close to a transmitting mobile station. Such a high threshold level may comprise a configurable parameter, e.g., a user-determined/configurable parameter. Such a high threshold level may indicate a level of accuracy desired by a user or by an application of a mobile station desiring a position. In an example, a receiving mobile station may estimate its location to be a location of the transmitting mobile station that is included in a packet transmitted by such a transmitting mobile station.

Accordingly, by listening to communications from other mobile stations and/or other wireless network elements, a mobile station which does not contain high resolution timing capabilities may be able to estimate its location with a relatively high or desired degree of precision. Moreover, such a process is also applicable to a mobile station that does have high resolution timing capabilities. For example, such a mobile station may determine its location based, at least in part, upon transmissions received from other mobile stations and/or wireless network elements without performing such timing measurements itself. By avoiding performing such timing measurements, for example, a mobile station having high resolution timing capabilities may conserve power and/or thereby effectively make more efficient use of stored power in a battery.

In some implementations, a mobile station that has high resolution timing capabilities may conserve power by listening to communications between other mobile stations and/or wireless network elements, such as access points or femtocells. Such a mobile station may also transmit a probe request to another mobile station and may measure round trip time until an acknowledgement packet is received from the other mobile station, for example. Such a mobile station may determine its range to the other mobile station, using a location indicated in either an acknowledgement from the other mobile station or in a probe request transmitted by the other mobile station to another wireless network element. A database accessible via a wireless network may, for example, store a mapping of mobile station MAC addresses and locations which may be updated periodically by each mobile station with a timestamp. If a range is determined from a particular mobile station this database can be looked up for a second mobile station to be able to trilaterate/triangulate its position (e.g., performing trilateration).

In one implementation, a mobile station may receive communications from various sources. Such communications may include information, such as within a packet header, indicating a destination device of such communications. In one implementation, a mobile station may determine whether a received communication is addressed to the mobile station by, for example, determining a destination address contained within a packet header and may ignore the communication if the destination address does not refer to or designate the mobile station. However, in one or more implementations, as discussed herein, some communications may be processed even if they are not addressed to the mobile station. For example, location information contained within communications addressed to other mobile stations or other communication devices may be utilized at least in part by the mobile station to estimate its own position.

According to various implementations, as discussed herein, a mobile station may listen to communications transmitted by other peer mobile stations and/or wireless network elements. Such peer mobile stations and/or wireless network elements may broadcast their respective locations within various communications, such as probe request packets and/or acknowledgement packets. A mobile station may conserve power and/or accurately determine its location by utilizing such location information transmitted from other devices within a wireless network, instead of having to determine its location primarily by transmitting probe requests and measuring round trip timing intervals until acknowledgements are received, for example.

Figure 1:
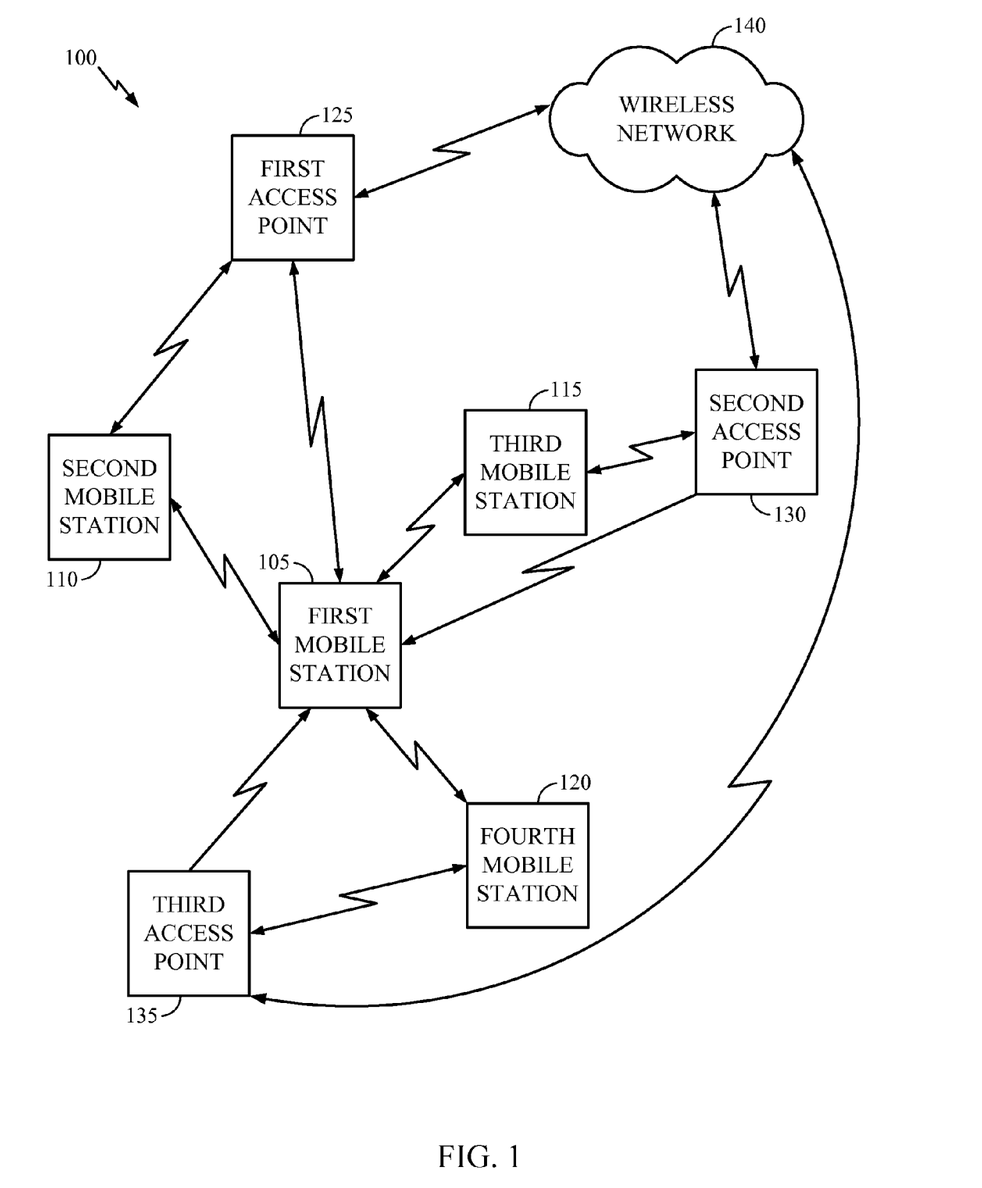
FIG. 1 is a schematic diagram of a local network according to one implementation.

FIG. 1 is a schematic diagram of a local network 100 according to one implementation. There may be several mobile stations within local network 100, such as a first mobile station 105, a second mobile station 110, a third mobile station 115, a fourth mobile station 120. There may also be one or more wireless network elements within local network 100, such as first access point 125, second access point 130, and third access point 135. Each access point and mobile station may be in communication with a wireless network 140, for example.

One or more mobile stations within local network 100 may desire to determine their respective locations at a particular time. One way of estimating location, for example, is to receive navigation signals from an SPS. However, if such navigation signals are not available, such as if a mobile station is within certain structures, such as buildings or tunnels, for example, a mobile station may determine its location based on communications transmitted to and received from other elements on local network 100. For example, as discussed, a mobile station may transmit a probe request packet to a wireless network element having a known location and measure a time interval until an acknowledgement packet is received back from the wireless network element. Based on such a measured time interval, a distance from such a wireless network element to such a mobile station may be estimated. However, as discussed, a mobile station which does not utilize a high resolution timing chip or circuitry may not be able to measure a time interval with precision. Moreover, transmission of such probe requests may utilize substantial power, impacting a mobile station's battery life. Accordingly, one or more of such mobile stations on local network 100 may listen to communications transmitted from other elements on local network 100 and determine its own location based on such received communications, as discussed below.

In one implementation, first mobile station 105 may lack a high resolution timing chip or circuitry and may listen to communications transmitted by other mobile stations on local network 100. For example, one or more of second mobile station 110, third mobile station 115, and fourth mobile station 120 may include high resolution timing chips or circuitry.

A mobile station having such a high resolution timing chip or circuitry may transmit a probe request addressed to a wireless network element and measure a roundtrip time interval until an acknowledgement packet is received from the wireless network element. For example, second mobile station 110 may utilize a higher resolution timing chip or circuitry and may transmit a probe request packet to first access point 125. Second mobile station 110 may include its most recently determined location within a probe request packet.

Figure 2:
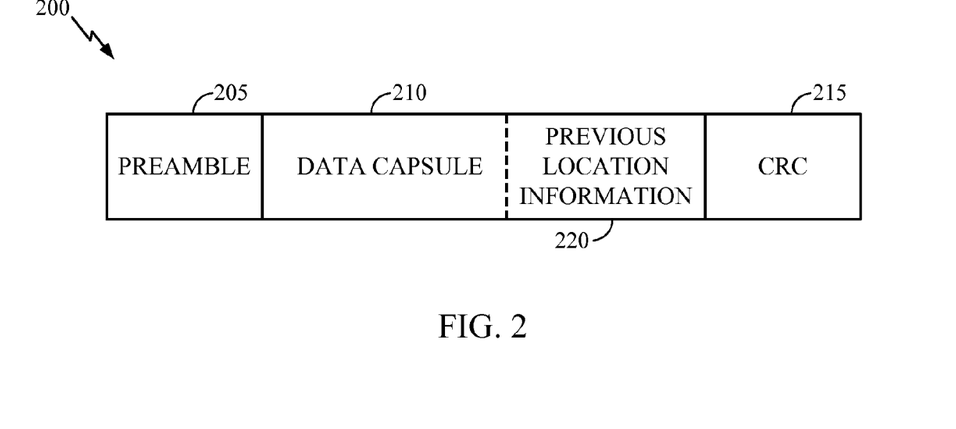
FIG. 2 illustrates a probe request packet according to one implementation.

FIG. 2 illustrates a probe request packet 200 according to one implementation. Probe request packet 200 may include a preamble 205, data capsule 210, and a cyclic redundancy check (CRC) portion 215. Preamble 205 may comprise a portion of probe request packet 200 containing no data. For example, preamble 205 may be utilized for synchronizing between a mobile station transmitting probe request packet 200 and a wireless device receiving probe request packet 200. Preamble 205 may also be utilized to compute a frequency estimate of a carrier signal and to compute signal strength at a receiver and thus to set gain parameters of an automatic gain control (AGC) circuit in the receiver. CRC portion 215 may include a hash function utilized to detect corruption of data transmitted within data capsule 210, for example.

Data capsule 210 may include previous location information portion 220. For example, a most recently determined location for a mobile station transmitting probe request packet 200 may be included within previous location information portion 220. If probe request packet 200 is transmitted to a wireless network device, such as an access point, a previously determined location included within previous location information portion 220 may be ignored by such a wireless network device in some implementations. However, a nearby mobile station receiving the probe request packet 200 may utilize such a previous location to determine its location relative to a mobile station transmitting such a probe request packet, for example.

Location information may be stored in any of many possible formats, based on the particular application at issue. For example, such location information may be stored as World Geodetic System 1984 (WSG84) format. Alternatively, x, y, and z coordinates may be stored, along with a reference location context identifier denoting a local map to which such a coordinate system refers. In one implementation, confidence information may also be included to indicate how reliable previous location information for a mobile station is likely to be. For example, if a mobile station has remained relatively stationary since its location was previously determined, there may be a relatively high confidence level that such a mobile station is located in approximately the same places as where it was when the previous location information was determined. However, if such a mobile station is rapidly moving through a coverage area, there may be a much lower confidence level that such a mobile station is located in approximately the same places as where it was when the previous location information was determined Referring back to FIG. 1, if second mobile station 110 transmits a probe request packet to first access point 125, a previously determined location for second mobile station 110 may be included within a field of such a probe request packet, as discussed with respect to FIG. 2. First mobile station 105 may receive a probe request packet transmitted by second mobile station 110 and may utilize such information to determine its own location. In one implementation, first mobile station 105 may measure a signal strength of a signal containing such a probe request packet as received from second mobile station 110. First mobile station 105 may estimate a range to second mobile station 110 based, at least in part, on such a measured signal strength. In one implementation, for example, mobile stations and/or wireless network elements within local network 100 may transmit signals at a known signal strength and based on a difference between a measured signal strength and the known transmission signal strength, a range to a mobile station transmitting a signal may be estimated.

If such a receive signal strength is above a predefined threshold level, for example, such as −41.0 dBm with a transmission power of 17.0 dBm, a mobile station receiving a probe request from another mobile station may determine that the transmitting mobile station is within a very close proximity, such as, for example, within 30.0 feet. If, for example, first mobile station 105 receives a probe request signal transmitted by second mobile station 110 to first access point 125 and determines that a measured signal strength of such a received signal is, for example, −41.0 dBm with a transmission power of 17.0 dBm, first mobile station may estimate its current location to be within 30.0 feet of the previous location of second mobile station 110 that is included within a field of such a probe request signal.

Alternatively, if a measured signal strength of a probe request signal transmitted by second mobile station 110 to first access point 125 is above a secondary threshold, such as above −70.0 dBm with a transmission power of 17.0 dBm, but below an primary threshold −41.0 dBm with a transmission power of 17.0 dBm, a range between a transmitting mobile station and a receiving mobile station may be determined. In such an implementation, a receiving mobile station may utilize a previously transmitted location of a transmitting device as an estimated current location for such a transmitting mobile station. A receiving mobile station may also receive probe requests transmitted by other mobile stations to various wireless network devices. Such a receiving mobile station may additionally receive acknowledgement signals from wireless network elements responsive to such probe requests. At least some of such probe request signals may include respective previously determined locations for such transmitting mobile stations. Wireless network devices may include location information for themselves within acknowledgement signals. Alternatively, if such wireless network elements are permanently affixed to certain locations, location information for such wireless network elements may be stored in a database or other memory or device accessible by a mobile station.

Accordingly, referring to FIG. 1, first mobile station 105 may receive probe request signals transmitted from second mobile station 110 to first access point 125, third mobile station 115 to second access point 130, and from fourth mobile station 120 to third access point 135. Moreover, first mobile station 105 may also receive acknowledgement signals transmitted from first access point 125 to second mobile station 110, second access point 130 to third mobile station 115, and third access point 135 to fourth mobile station 120. First mobile station may determine respective ranges to each transmitting device based on measured signal strength of received signals. After such ranges and locations for at least three of such transmitting devices have been determined, first mobile station 105 may triangulate its position based on such information.

Although implementations have been described where previously determined location information is included within a field of a probe request, it should be appreciated that in some implementations, such location information may be included in other transmissions. For example, a mobile station may store its information indicative of its previously determined location as a field in a data packet transmitted to a wireless network device. A nearby mobile station may receive such a transmission and use such information and a range to such a transmitting mobile station (e.g., based at least in part on a measured signal strength of a received signal) during, e.g., a trilateration/triangulation process to estimate its own location.

Figure 3:
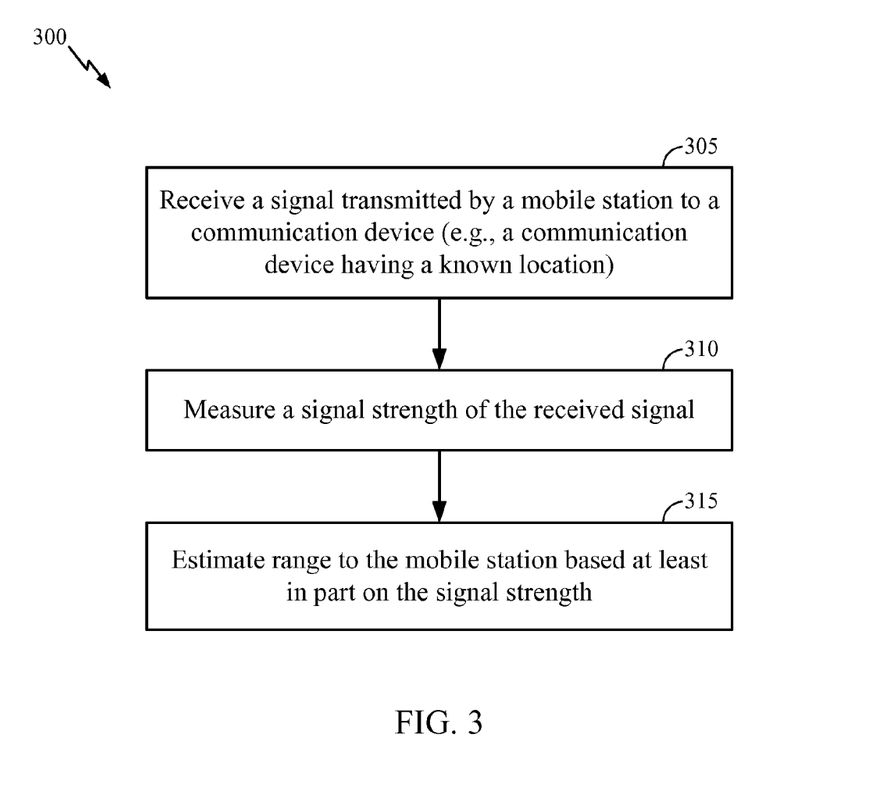
FIG. 3 is a flow diagram illustrating a process for a first mobile station to determine a range to a second mobile station transmitting a signal according to one implementation.

FIG. 3 is a flow diagram illustrating a process 300 for a first mobile station to determine a range to a second mobile station transmitting a signal according to one implementation. First, at operation 305, a first mobile station receives a signal transmitted from a second mobile station to a communication device (e.g., a communication device having a known location). Such a communication device may comprise a wireless network element such as an access point or a femtocell, for example. A signal received by such a first mobile station may include a location estimate for the second mobile station.

Next, at operation 310, a signal strength of a signal received by the first mobile station may be measured. Finally, at operation 315, a range from the first mobile station to the second mobile station may be estimated based at least in part on a measured signal strength of the received signal. Ranges to other transmitting mobile stations and other wireless network elements may also be estimated and the first mobile station may triangulate its position based on such ranges to mobile stations or wireless network elements having known locations, as discussed with respect to FIG. 1.

Figure 4:
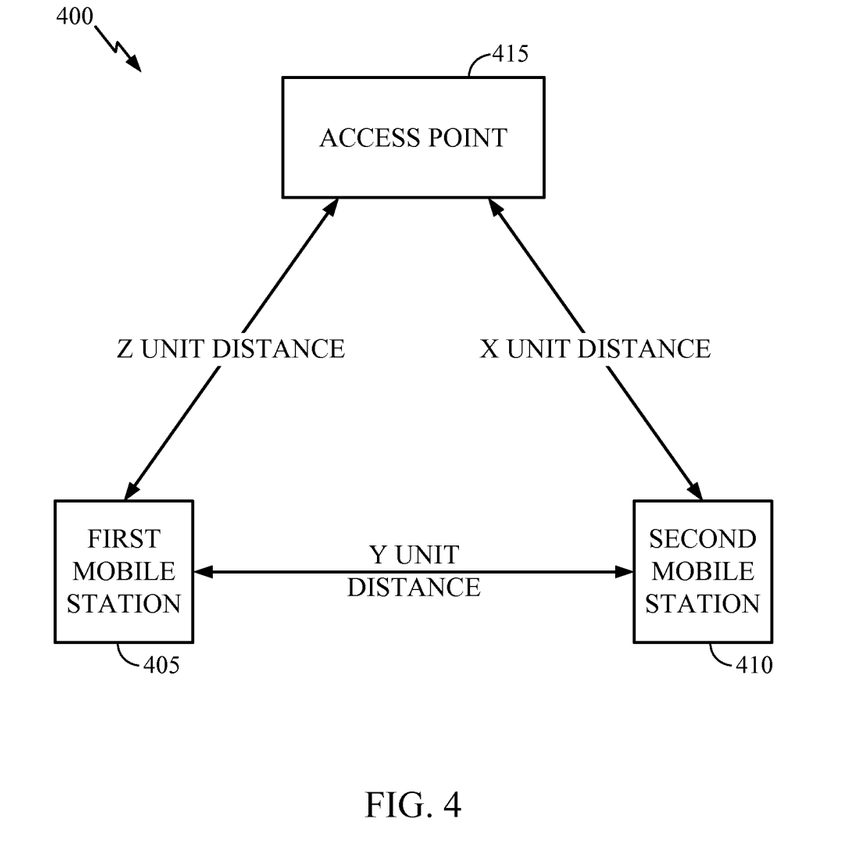
FIG. 4 is a schematic diagram of a local network for location determination according to one implementation.

FIG. 4 shows a local network 400 for location determination according to one implementation. As shown, local network 400 includes a first mobile station 405, a second mobile station 410, and an access point 415 or other wireless network element. As shown, first mobile station may be disposed Z units of distance from access point 415 and Y units of distance from second mobile station 410. Second mobile station 410 may be disposed X units of distance from access point 415.

In this implementation, both first mobile station 405 and second mobile station 410 may contain a high resolution timing chip or circuitry. In this example, first mobile station 405 may conserve power by utilizing probe requests and location information transmitted by second mobile station 410 to determine its own location.

In one implementation, second mobile station 410 may transmit a probe request to access point 415 and may include an estimate of its previous location within such a probe request, as discussed. First mobile station 405 may receive such a probe request and may utilize such location information for second mobile station 410 as a current location of second mobile station 410. First mobile station 405 may subsequently transmit a signal to second mobile station 410 requesting a response or acknowledgement. Using its high resolution timing capabilities, first mobile station 405 may measure a time interval between transmitting such a signal and receiving a response from second mobile station 410. After accounting for any relevant processing delays, first mobile station 405 may estimate its range to second mobile station 410 based on such a roundtrip time interval. First mobile station 405 may estimate its range to other mobile stations in a similar manner. Once three or more ranges from first mobile station 405 to other mobile stations having known locations have been determined, first mobile station 405 may triangulate its position.

In one implementation, first mobile station 405 may measure a timing delay between (a) receipt of a probe request transmitted by second mobile station 410 to access point 415, and (b) receipt of an acknowledgement response transmitted from access point 415 to second mobile station 410. Using a timing delay between receipt of such signals, first mobile station 405 may estimate its distance from access point 415. Based upon a distance between first mobile station 405 and second mobile station 410 (denoted as Y units of distance in FIG. 4), a roundtrip time error is introduced. Specifically, the larger the distance between first mobile station 405 and second mobile station 410, the larger the roundtrip time error for a roundtrip time interval based on signals transmitted between second mobile station 410 and access point 415 is likely to be. A total round-trip time error as measured at first mobile station 405 may be equivalent to $(Y+Z-X)/c$, where c is the speed of such wireless signals in units of distance (e.g., units such as feet or meters chosen for X, Y, and Z distances) per nanosecond. For example, c may comprise the speed of light. An estimate of range between first mobile station 405 and access point 415 based on a timing delay between receipt of a probe request from second mobile station 410 and an acknowledgement from access point 415 is reasonably accurate provided, for example, that a distance between first mobile station 405 and second mobile station 410 is small.

Implementations, as discussed herein, may allow mobile stations which do not support high resolution (e.g., nanosecond) timing on their receivers to be able to receive location hints by overhearing signals transmitted throughout their environment. For mobile stations which do support high resolution timing, on the other hand, such implementations may allow such mobile stations to acquire additional measurements by receiving signals transmitted from other mobile stations or to reduce a number of measurements to triangulate a position.

Circuitry, such as transmitters and/or receivers may provide functionality, for example, through the use of various wireless communication networks such as a wireless wide area network (WWAN), a wireless local area network (WLAN), a wireless personal area network (WPAN), and so on. The terms "network" and "system" are often used interchangeably herein. The terms "position" and "location" are often used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Communications (GSM), Digital Advanced Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. The techniques may be implemented for use with an Ultra Mobile Broadband (UMB) network, a High Rate Packet Data (HRPD) network, a CDMA2000 1x network, GSM, LTE, WiMAX, and/or the like.

Figure 5:
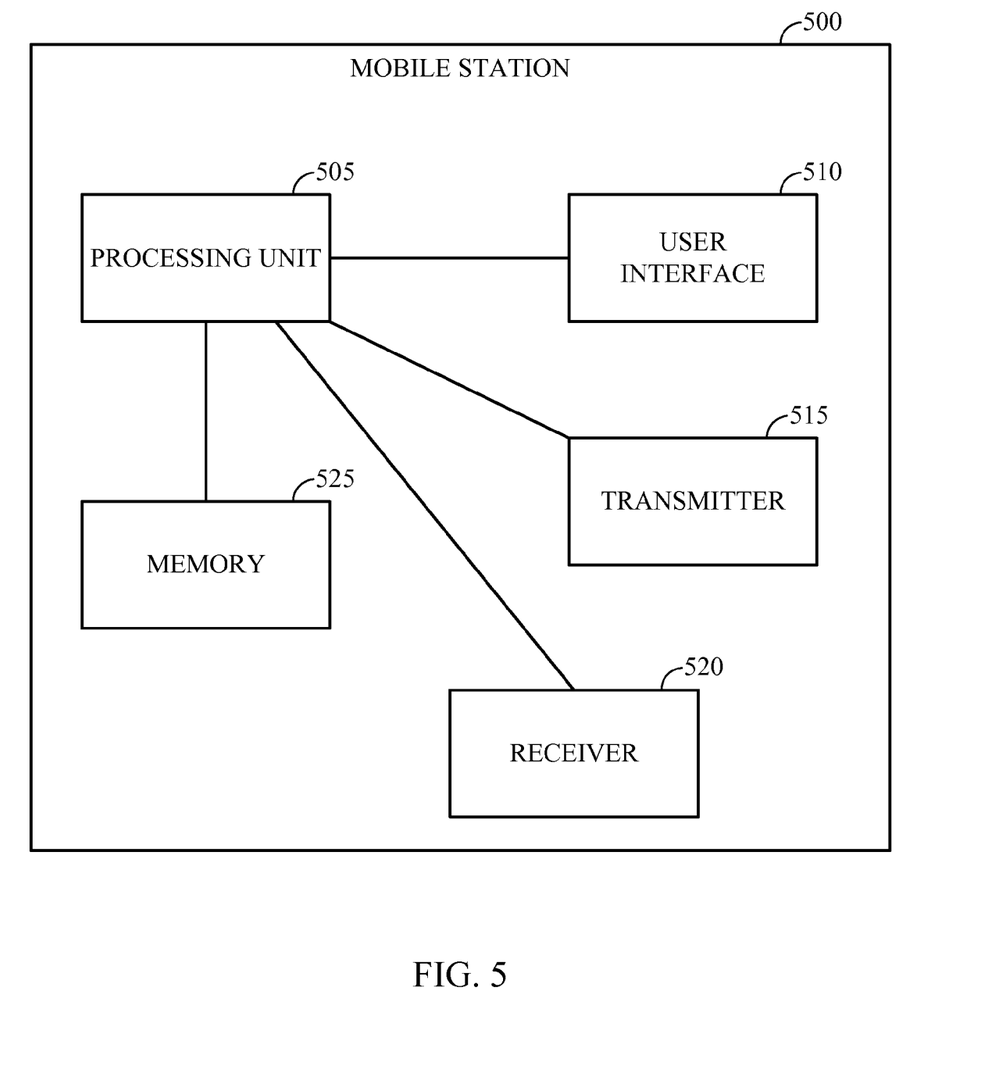
FIG. 5 is a schematic block diagram of a particular implementation of a mobile station according to one implementation.

FIG. 5 is a schematic block diagram of a particular implementation of a mobile station 500 according to one implementation. Mobile station 500 may include transmitter 515 which may be adapted to modulate an RF carrier signal with baseband information, such as voice or data, and receiver 520 which may demodulate a modulated RF carrier to obtain such baseband information.

Mobile station 500 may include several elements such as a processing unit 505, user interface 510, transmitter 515, receiver 520, and memory 525. User interface 510 may comprise a plurality of devices for inputting or outputting user information such as voice or data. Such devices may include, for example, a keyboard/keypad, a display screen (e.g., a touch screen), a microphone, a speaker, buttons/dials/knobs, just to name a few examples. User interface 510 may present a map to a user.

Memory 525 may be adapted to store machine-readable instructions, which are executable to perform one or more of processes, examples, or implementations thereof which have been described or suggested. Processing unit 505 may be adapted to access and execute such machine-readable instructions. Through execution of these machine-readable instructions, processing unit 505 may direct various elements of mobile station 500 to perform one or more functions.

Transmitter 515 may utilize an antenna to transmit communications, such as packet-based communications to other wireless devices. Receiver 520 may also utilize such an antenna to receive communications, such as packet-based communications from other wireless devices.

Some portions of the detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. For example, a specific computing apparatus may comprise one or more processing units programmed with instructions to perform one or more specific functions.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, an SPS may include any combination of one or more global and/or regional navigation satellite systems and/or augmentation systems, and SPS signals may include SPS, SPS-like, and/or other signals associated with such one or more SPS.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices designed to perform the functions described herein, and/or combinations thereof.

For an implementation involving firmware and/or software, certain methodologies may be implemented with modules (e.g., procedures, functions, and so on) that perform the functions described herein. Any machine readable medium tangibly embodying instructions may be used in implementing the methodologies described herein. For example, software codes may be stored in a memory of a mobile station and/or an access point and executed by a processing unit of the device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. A computer-readable medium may take the form of an article of manufacture. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method, comprising:
   receiving, by a first mobile station, a signal transmitted from a second mobile station and addressed to a communication device to request the communication device to send an acknowledgement signal to the second mobile station to estimate a range from the communication device to the second mobile station so as to enable determining a current location of the second mobile station, wherein the signal includes a previous location estimate for the second mobile station; and
   determining an estimated location of the first mobile station based at least in part on a measured signal strength of the signal and on the previous location included in the signal.

2. The method of claim 1, wherein the determining is performed in response to the measured signal strength of the signal exceeding a predefined threshold.

3. The method of claim 2, wherein the predefined threshold comprises a configurable parameter.

4. The method of claim 3, wherein the predefined threshold is user-configurable.

5. The method of claim 1, further comprising receiving the acknowledgement signal from the communication device.

6. The method of claim 5, further comprising measuring a delay between receiving the signal transmitted from the second mobile station and receiving the acknowledgement signal.

7. The method of claim 6, further comprising estimating a further range between the first mobile station and the communication device based at least in part on the measured delay.

8. The method of claim 1, wherein the communication device comprises an access point.

9. The method of claim 8, wherein the access point comprises a femtocell.

10. The method of claim 1, further comprising performing trilateration to estimate a location of the first mobile station based at least in part on estimated ranges between the first mobile station and at least three communication devices having known locations.

11. The method of claim 1, wherein the signal comprises a probe request.

12. An apparatus, comprising:
   a receiver to receive wireless signals; and
   one or more processing units programmed with instructions to:
   determine an estimated location of the apparatus based at least in part on a measured signal strength of a signal received at the receiver from a mobile station and addressed to a communication device, and further based on a previous location estimate for the mobile station included in the signal, the signal addressed to the communication device used to request the communication device to send an acknowledgement signal to the mobile station to estimate a range from the communication device to the mobile station so as to enable determining a current location of the mobile station.

13. The apparatus of claim 12, wherein the receiver is capable of receiving the acknowledgement signal from the communication device.

14. The apparatus of claim 13, wherein the one or more processing units are further programmed with instructions to measure a delay between receiving the signal transmitted from the mobile station and receiving the acknowledgement signal.

15. The apparatus of claim 14, wherein the one or more processing units are further programmed with instructions to estimate a further range to the communication device based at least in part on the measured delay.

16. The apparatus of claim 12, wherein the one or more processing units are programmed with instructions to determine the estimated location based at least in part on the previous location estimate for the mobile station in the received signal in response to the measured signal strength of the signal exceeding a predefined threshold.

17. The apparatus of claim 16, wherein the predefined threshold comprises a configurable parameter.

18. The apparatus of claim 17, wherein the predefined threshold is user-configurable.

19. The apparatus of claim 12, wherein the one or more processing units are further programmed with instructions to perform trilateration to estimate a location based at least in part on estimated ranges to at least three communication devices having known locations.

20. The apparatus of claim 12, wherein the communication device comprises a femtocell.

21. An apparatus, comprising:
means for processing a signal received by a first mobile station and transmitted from a second mobile station and addressed to a communication device to request the communication device to send an acknowledgement signal to the second mobile station to estimate a range from the communication device to the second mobile station so as to enable determining a current location of the second mobile station, wherein the signal includes a previous location estimate for the second mobile station; and
means for determining an estimated location of the first mobile station based at least in part on a measured signal strength of the signal and on the previous location included in the signal.

22. The apparatus of claim 21, wherein the means for determining is configured for estimating the estimated location of the first mobile station based at least in part on the previous location estimate for the second mobile station in response to the measured signal strength of the signal exceeding a predefined threshold.

23. The apparatus of claim 22, wherein the predefined threshold comprises a configurable parameter.

24. The apparatus of claim 23, wherein the predefined threshold is user-configurable.

25. The apparatus of claim 21, wherein the means for processing is capable of processing the acknowledgement signal received from the communication device.

26. The apparatus of claim 21, further comprising means for measuring a delay between receiving the signal transmitted from the second mobile station and receiving the acknowledgement signal.

27. The apparatus of claim 26, wherein the means for determining is capable of estimating a further range between the first mobile station and the communication device based at least in part on the measured delay.

28. The apparatus of claim 21, further comprising means for performing trilateration to estimate a location of the first mobile station based at least in part on estimated ranges between the first mobile station and at least three communication devices having known locations.

29. The apparatus of claim 21, wherein the communication device comprises a femtocell.

30. An article comprising: a non-transitory storage medium comprising machine-readable instructions stored thereon which, in response to being executed by a special purpose apparatus, direct the special purpose apparatus to:
process a signal received by a first mobile station and transmitted from a second mobile station and addressed to a communication device to request the communication device to send an acknowledgement signal to the second mobile station to estimate a range from the communication device to the second mobile station so as to enable determining a current location of the second mobile station, wherein the signal includes a previous location estimate for the second mobile station; and
determine an estimated location of the first mobile station based at least in part on a measured signal strength of the signal and on the previous location included in the signal.

31. The article of claim 30, wherein the instructions, in response to being executed by the special purpose computing device, direct the special purpose computing device to a determine the estimated location of the first mobile station based at least in part on the previous location estimate for the second mobile station in the received signal in response to the measured signal strength of the received signal exceeding a predefined threshold.

32. The article of claim 31, wherein the predefined threshold comprises a configurable parameter.

33. The article of claim 32, wherein the predefined threshold is user-configurable.

34. The article of claim 30, wherein the instructions, in response to being executed by the special purpose computing device, further direct the special purpose computing device to estimate a further range between the first mobile station and the communication device based at least in part on a measured signal strength of the acknowledgment signal received from the communication device.

35. The article of claim 30, wherein the instructions, in response to being executed by the special purpose computing device, further direct the special purpose computing device to measure a delay between receiving the signal transmitted from the second mobile station and receiving the acknowledgment signal from the communication device.

36. The article of claim 35, wherein the instructions, in response to being executed by the special purpose computing device, further direct the special purpose computing device to estimate a further range between the first mobile station and the communication device based at least in part on the measured delay.

37. The article of claim 30, wherein the instructions, in response to being executed by the special purpose computing device, further direct the special purpose computing device to perform trilateration to estimate a location of the first mobile station based at least in part on estimated ranges between the first mobile station and at least three communication devices having known locations.

38. The article of claim 30, wherein the communication device comprises a femtocell.

39. A method, comprising:
receiving, by a first mobile station, a signal transmitted from a second mobile station and addressed to a communication device, wherein the signal comprises a location estimate for the second mobile station;
initiating transmission of a probe request, from the first mobile station, to the second mobile station; and
estimating a range from the first mobile station to the second mobile station based at least in part on a measured round trip time delay between transmission of the probe request and receipt of a probe request acknowledgement signal at the first mobile station.

40. The method of claim 39, further comprising receiving an acknowledgement signal from the communication device.

41. The method of claim 39, further comprising estimating a range between the first mobile station and the communication device based at least in part on a measured signal strength of the probe request acknowledgement signal.

42. The method of claim 39, further comprising performing trilateration to estimate a location of the first mobile station based at least in part on estimated ranges between the first mobile station and at least three communication devices having known locations.

43. The method of claim 39, wherein the signal transmitted from the second mobile station to the communication device comprises a probe request.

44. The method of claim 39, wherein the communication device comprises a femtocell.

45. An apparatus, comprising:
a receiver to receive wireless signals; and
one or more processing units programmed with instructions to:
process a signal transmitted from a mobile station and addressed to a communication device, wherein the signal comprises a location estimate for the mobile station;
transmit a probe request to the mobile station;
receive a probe request acknowledgement transmitted from the mobile station; and
estimate a range to the mobile station based at least in part on a measured round trip time delay between transmitting the probe request and receiving the probe request acknowledgement.

46. The apparatus of claim 45, wherein the one or more processing units are further programmed with instructions to estimate a range to the communication device based at least in part on a measured signal strength of an acknowledgement signal received from the communication device.

47. The apparatus of claim 45, wherein the one or more processing units are further programmed with instructions to perform trilateration to estimate a location based at least in part on estimated ranges to at least three communication devices having known locations.

48. The apparatus of claim 45, wherein the communication device comprises a femtocell.

49. An apparatus, comprising:
means for processing a signal received by a first mobile station and transmitted from a second mobile station and addressed to a communication device, wherein the signal comprises a location estimate for the second mobile station;
means for initiating transmission of a probe request, from the first mobile station to the second mobile station; and
means for estimating a range from the first mobile station to the second mobile station based at least in part on a measured round trip time delay between transmission of the probe request and receipt of a probe request acknowledgement at the first mobile station.

50. The apparatus of claim 49, wherein the means for estimating is capable of estimating a range between the first mobile station and the communication device based at least in part on a signal strength of an acknowledgement signal transmitted from the communication device.

51. The apparatus of claim 49, further comprising means for performing trilateration to estimate a location of the first mobile station based at least in part on estimated ranges between the first mobile station and at least three communication devices having known locations.

52. The apparatus of claim 49, further comprising means for receiving the signal transmitted from the second mobile station.

53. An article comprising: a non-transitory storage medium comprising machine-readable instructions stored thereon which, in response to being executed by a special purpose computing device, direct the special purpose computing device to:
process a signal received from a mobile station and transmitted and addressed to a communication device, wherein the signal comprises a location estimate for the mobile station;
initiating transmission of a probe request to the mobile station; and
estimating a range to the mobile station based at least in part on a measured round trip time delay between transmission of the probe request and receipt of a probe request acknowledgement from the mobile station.

54. The article of claim 53, wherein the instructions, in response to being executed by the special purpose computing device, further direct the special purpose computing device to estimate a range to the communication device based at least in part on a measured signal strength of an acknowledgement signal received from the communication device.

55. The article of claim 53, wherein the instructions, in response to being executed by the special purpose computing device, further direct the special purpose computing device to perform trilateration to estimate a location based at least in part on estimated ranges to at least three communication devices having known locations.

* * * * *